United States Patent [19]

Sellner

[11] 4,224,600
[45] Sep. 23, 1980

[54] ARRAYS FOR PARALLEL PATTERN RECOGNITION

[75] Inventor: Harvey R. Sellner, Newtown, Conn.

[73] Assignee: The Perkin-Elmer Corporation, Norwalk, Conn.

[21] Appl. No.: 23,984

[22] Filed: Mar. 26, 1979

[51] Int. Cl.² .............................................. G06K 9/12
[52] U.S. Cl. .......................... 340/146.3 MA; 364/200; 364/515
[58] Field of Search ........ 364/515, 416, 200 MS File, 364/900 MS File; 340/146.3 MA, 146.3 H, 146.3 F, 146.3 R

[56] References Cited

U.S. PATENT DOCUMENTS

| | | | |
|---|---|---|---|
| 3,106,698 | 10/1963 | Unger | 340/146.3 R |
| 3,106,699 | 10/1963 | Kamentsky | 340/146.3 H |
| 3,287,703 | 11/1966 | Slotnick | 364/200 |
| 3,624,604 | 11/1971 | Gibbard | 340/146.3 MA |
| 4,034,344 | 7/1977 | Saraga et al. | 340/146.3 H |
| 4,057,845 | 11/1977 | Ejiri et al. | 340/146.3 H |
| 4,060,713 | 11/1977 | Golay | 364/515 |
| 4,167,728 | 9/1979 | Sternberg | 364/515 |
| 4,174,514 | 11/1979 | Sternberg | 340/146.3 MA |

OTHER PUBLICATIONS

Duff et al., "A Cellular Logic Array for Image Processing", *Pattern Recognition*, Sep. 1973, vol. 5, pp. 229–247.
Kruse, "A Parallel Picture Processing Machine", *IEEE Transactions on Computers*, Dec. 1973, vol. C-22, No. 12, pp. 1075–1087.
McCormick, "The Illinois Pattern Rec. Computer–Iliac III", *IEEE Transactions on Electron. Computers*, Dec. 1963, vol. EC-12, pp. 791–813.
Stamopoulos, "Parallel Image Processing", *IEEE Transactions on Computers*, Apr. 1975, vol. C-24, No. 4, pp. 424–433.
Golay, "Hexagonal Parallel Pattern Transform.", *IEEE Trans. on Computers*, Aug. 1969, vol. C-18, No. 8, pp. 733–740.

*Primary Examiner*—Leo H. Boudreau
*Attorney, Agent, or Firm*—Salvatore A. Giarratana; Francis L. Masselle; Edwin T. Grimes

[57] ABSTRACT

In order to perform pictorial pattern recognition at an extremely high data rate, a linear array of photodetectors reads information recorded on photograhic film and the data read is transferred sequentially to an array of microprocessors, converted into binary form and stored in the memories. The microprocessors operating in conjunction with transformation logic then perform successive transformations using an analysis technique, known in the art, which utilizes hexagonal surrounds.

13 Claims, 14 Drawing Figures

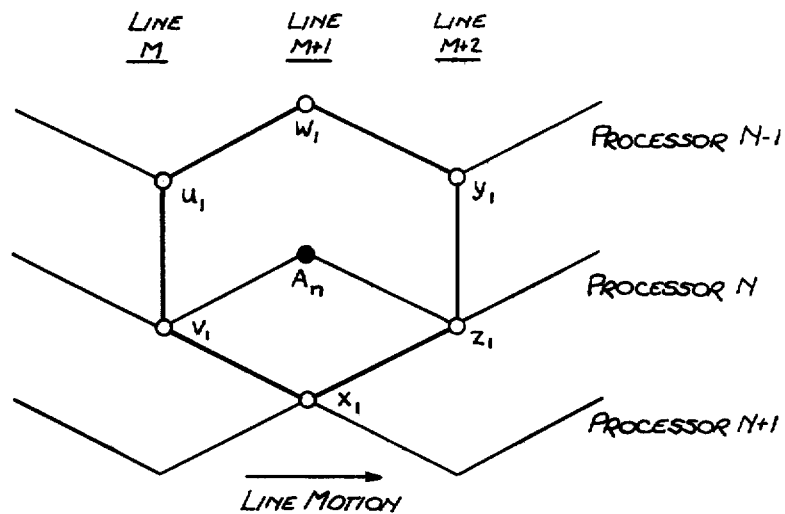
Fig. 6.
Fig. 7.
KEY
- - - - - - PATH FOLLOWED BY A SINGLE LOGIC ELEMENT
— — — SAMPLE CENTERED ON LINE M+1
———— SAMPLE CENTERED ON LINE M+2
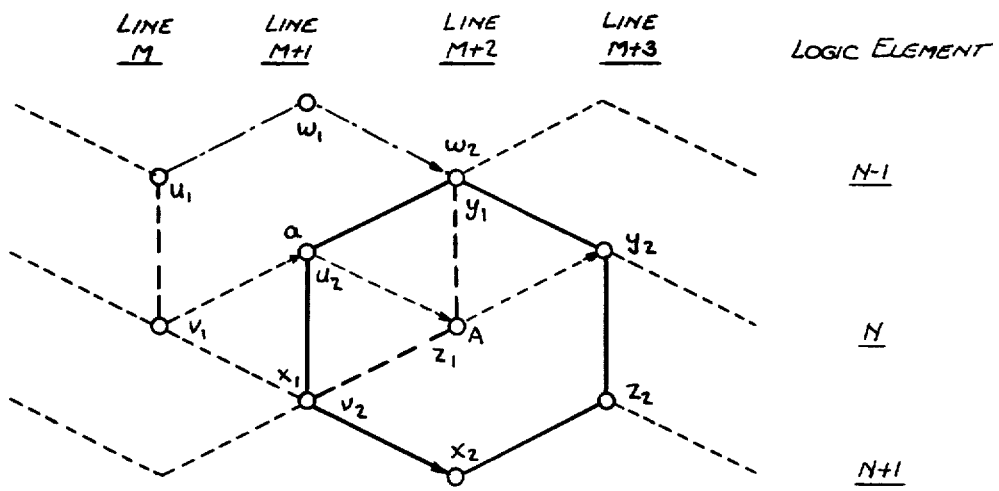

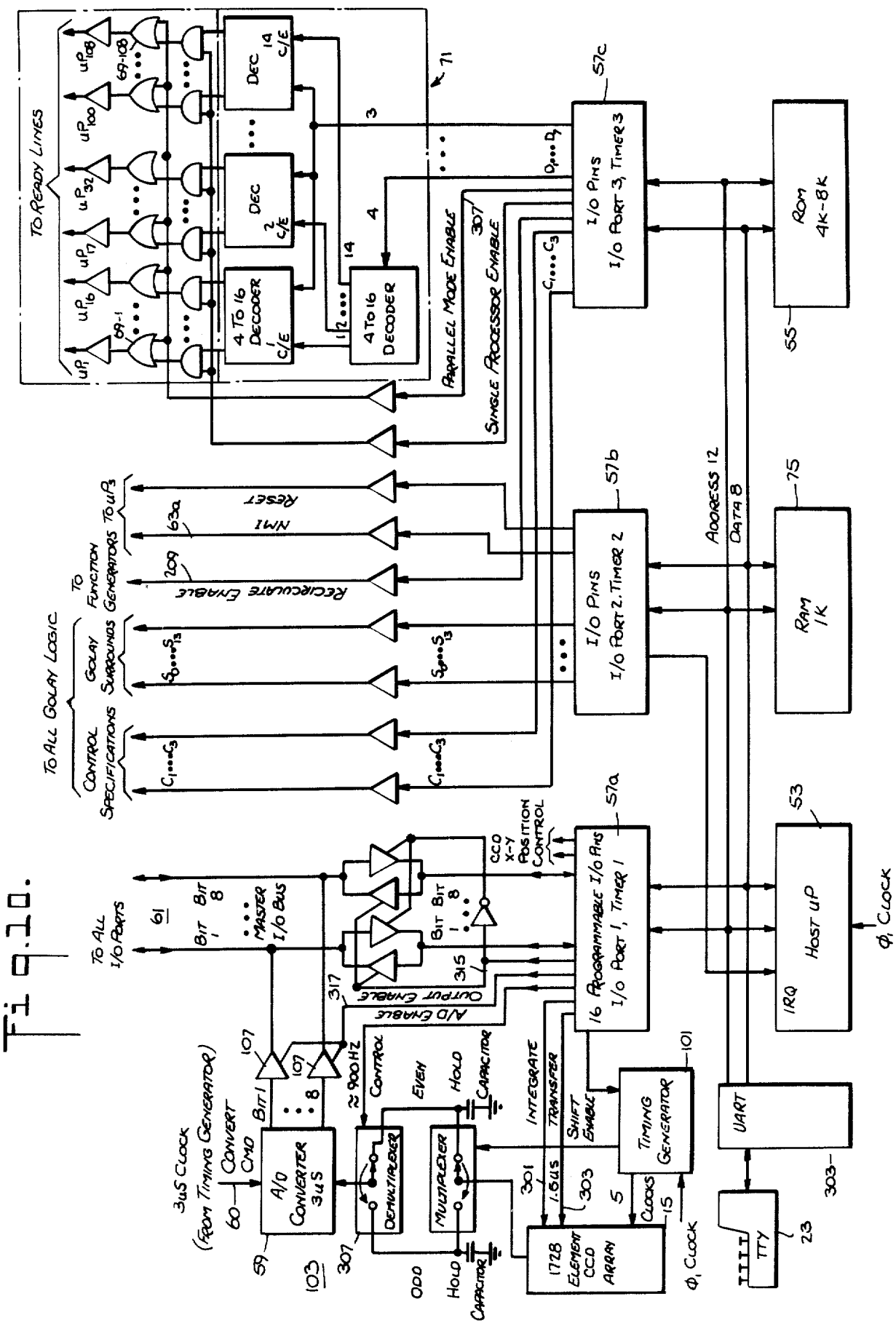

ARRAYS FOR PARALLEL PATTERN RECOGNITION

BACKGROUND OF THE INVENTION

This invention relates to analysis of images in general and more particularly to a method and apparatus for greatly increasing the data rates at which images can be analyzed, utilizing a previously developed image analysis technique.

U.S. Pat. No. 4,060,713, granted to M. J. E. Golay on Nov. 29, 1977, and assigned to the same assignee as the present invention, describes an extremely powerful image analysis technique. This technique is one in which an image, either photographic or otherwise, is first digitized and represented by a two-dimensional field of binary information. The information is arranged in such a form that every image element, except those at the edges, is surrounded by a hexagonal pattern of the other image elements. In the process, the pattern of information contained in the six neighboring elements immediately surrounding each element is determined. Thereafter, in accordance with the logic equations developed by Golay a modification of the central element being examined is carried out. After this is done for all elements in the field of elements, a new image results which can then be stored. Numerous logical operations are possible, such as the combination of a field before and after processing, combination of two processed fields, and so on. The techniques developed by Golay permit operations such as shrinking the image, swelling the image, isolating holes in images, and so on. All of this is described in much more detail in U.S. Pat. No. 4,060,713, the disclosure of which is hereby incorporated by reference. The processing of the images and the analysis which takes place will hereinafter be referred to as the Golay process.

In the method and apparatus described in the aforementioned patent, processing is done on an element by element basis. Such a process thus requires a significant amount of time to analyze a large image.

SUMMARY OF THE INVENTION

The present invention provides a system which permits greatly increasing the data rates in an image analysis apparatus utilizing the Golay process. To achieve this result, it employs an array of low cost micro processors with their associated memories operating on an entire line of data in parallel. More specifically, it includes a system in which the microprocessor accesses its memory through an input/output port permitting the microprocessor data bus to be separate from the memory bus. Through this construction, data can be transferred into memory from a source and back and forth between memory and the Golay logic processor in which the actual Golay transforms are carried out.

The microprocessors, of which a plurality will be required depending on the image size, are operated under the control of a central micro or mini computer. This computer also controls image input and other timing and control functions.

In general terms, a photograph or other image information to be analyzed is divided up into M lines with N elements or pixels in each line. The lines are offset to obtain a hexagonal pattern. Using microprocessors having a byte containing P bits, N over P microprocessors are provided. Associated with each microprocessor is a read-only memory and a random access memory. The random access memory can store M P byte words. Each microprocessor also has an I/O port with all of the I/O ports coupled to a master I/O bus. Two separate data busses are provided for each microprocessor system, one data bus being between the microprocessor and the I/O port and the other data bus coupling the I/O port and the associated RAM. Interposed between the I/O port and the RAM are P logic processors resulting in a total of N logic processors for the system. Means are provided to supply the input picture information over the master I/O bus. Also provided are control means for sequentially feeding the data to each of the microprocessor systems. The control means also include means to control the logic processors and to permit all microprocessors to operate simultaneously on a line of data. In the illustrated embodiment, the control means comprise a host microprocessors. The input means comprise the charge coupled device scanner.

The logic processors utilized make maximum use of ROM function generators. Pixel data of a hexagonal surround after being read in is coupled into a first ROM function generator to generate as a functin one of the 14 possible surround designations, the surround designation being generated irrespective of the rotation of the pattern. This information is decoded into a decimal output on one of 14 lines. The control means generate a surround specification which can be one or more of the 14 possible surround configurations. The decoded decimal outputs are compared with the specification in AND gates and the outputs of all AND gates ORed to give a function G[A]. This function along with the state of the central bit for the surround A and a three bit control specification are inputs to a further ROM which is programmed as a function generator to perform the various Golay functions which are possible such as marking, contracting, swelling, etc. The final output from this function generator is a single bit which is either in the "0" or "1" state depending on the input and the control specification supplied. The system is set up so that the information can be circulated from the RAM, through the logic processor and back to the RAM.

In the specific embodiment illustrated, P is equal to 8, i.e., microprocessors having an 8 bit word or 8 bit byte are utilized. A scanner capable of generating 1728 pixels in analog form is utilized. However, in order to get the proper hexagonal surrounds the odd and even pixels on adjacent lines are alternately used so that N is equal to 864. M is selected to be 512 and thus the RAMs associated with each microprocessor have the capability of storing 512 8 bit words. Furthermore, since the input device is in the form of a CCD array outputting analog information, an analog to digital converter is utilized to conver the analog data into 8 bit words and I/O ports having scratch pad memory are utilized for temporarily storing this 8 bit information concerning each pixel. The 8 bit information is then converted into a single bit by thresholding in the microprocessor. It should be recognized that if data is already available in a thresholded format, it could be provided directly through the I/O ports into the logic processors and RAMs of the individual microprocessors without thresholding.

BRIEF DESCRIPTION OF THE DRAWINGS

FIG. 3 illustrates the various possible hexagonal pattern configurations and gives for each configuration the Golay index.

FIG. 6 is a diagram similar to FIG. 2, helpful in understanding the manner in which data must be read in process.

FIG. 7 is a similar diagram.

FIG. 10 is a block diagram illustrating the input circuitry in more detail.

DETAILED DESCRIPTION OF THE INVENTION

Figure 1:
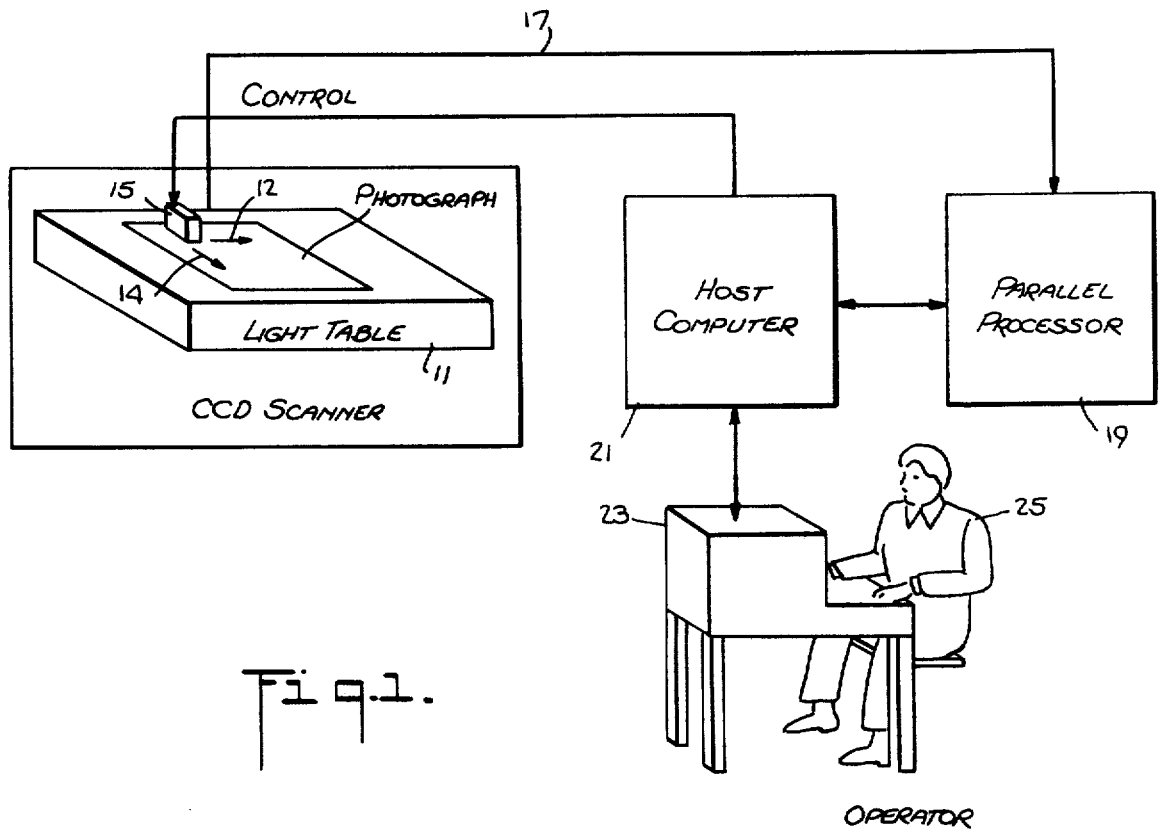
FIG. 1 is a block diagram illustrating the system layout of one embodiment of the present invention.

FIG. 1 is a block diagram illustrating the system layout of one embodiment of the present invention. As illustrated, there is provided a light table 11 on which is placed a photographic transparency 13, which is to be analyzed. The transparency is scanned by a charge coupled device [CCD] scanner 15. The output from the CCD scanner 15 is provided on a line 17 to a parallel processor 19. Both the scanner 15 and the parallel processor 19 operate under the control of a host computer 21 which itself is under the control of a keyboard 23 at which an operator 25 can enter commands and which can also include a display for displaying transformed data. In addition, scanner 15 is mounted, in conventional fashion, for X and Y motion as indicated by arrows 12 and 14.

The CCD array may be, for example, a Fairchild CCD 121 containing 1728 sample elements. In general terms, the CCD scanner scans over the photographic transparency 13 as it is moved in both X and Y, and for each picture element or pixel the system generates a "1" where the gray scale image exceeds a specified threshold and a "0" when it does not. The exact manner in which the data is provided into the image processor will be described in more detail below. Once in the processor, the image is operated upon using the Golay transformers described in the aforementioned patent application to carry out whatever type of processing is necessary. In general, what has been thus far described is the same general type of system disclosed in the aforementioned patent. The difference is in parallel processor 19 and its operation in conjunction with the host computer 21.

Figure 2:
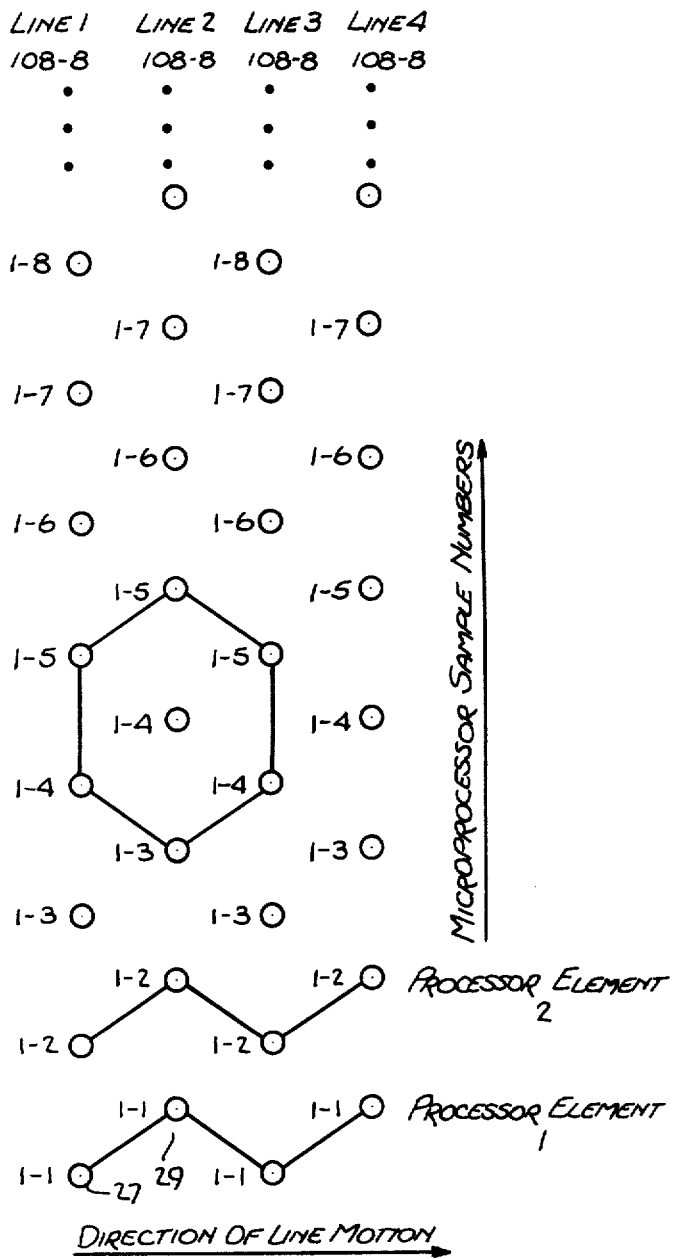
FIG. 2 is a diagram showing a picture element configuration of the picture to be analyzed along with the manner of sampling data.
Figure 12:
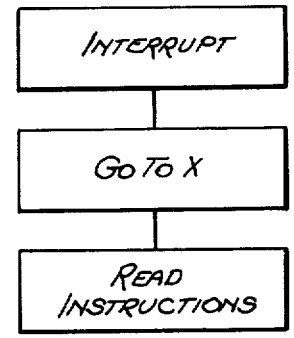
FIG. 12 is a flow diagram of the program used for loading data.

As noted above, the CCD scanner 15 is capable of generating 1728 samples per line. As illustrated by FIG. 2, The Golay process requires that data be available in the form of single pixels, e.g., a pixel 1-4, surrounded by a hexagonal array of six additional pixels. Golay processing makes use of the 14 possible patterns or surrounds shown on FIG. 3, each of which is assigned by Golay index. In order to get the desired configuration shown in FIG. 2, it is thus necessary to read out alternate odd and even pixels on alternate lines to obtain the type of pattern necessary, i.e., a pattern of hexagons. Thus, 864 pixels per line are read out. For example, as shown on FIG. 2, in the first line designated 27, the odd pixels are read, whereas in the next line 29, the even pixels are read. The manner in which this is accomplished in the hardware, will be explained in more detail below.

Figure 4:
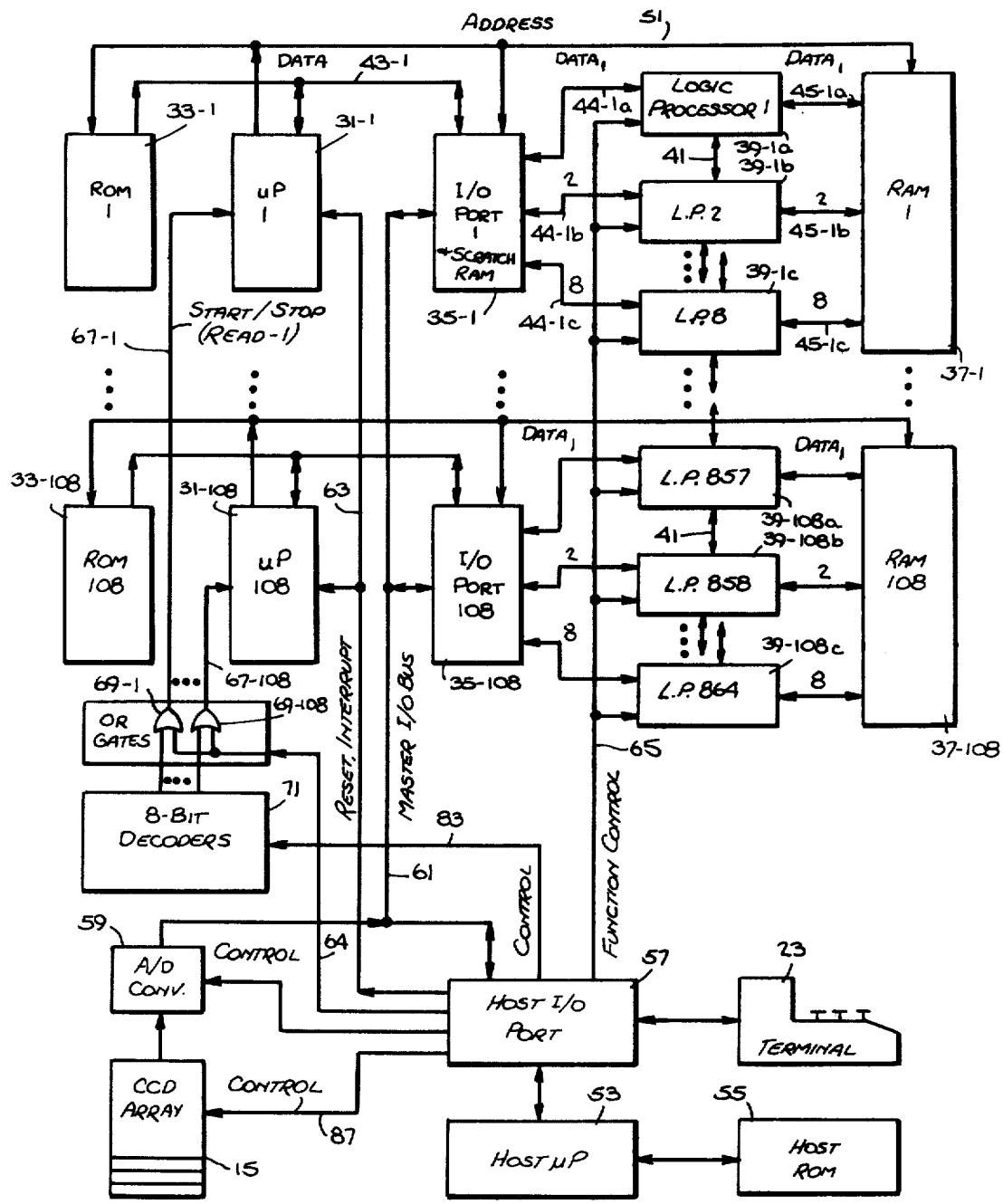
FIG. 4 is a basic block diagram of the system of the present invention.

In the present implementation, 8 bit microprocessors were chosen so that, in order to accommodate 864 pixels, a total of 108 microprocessors are required. The structure is shown in FIG. 4. Shown is the microprocessor 31-1 and the microprocessor 31-108. The dots therebetween indicate that additional microprocessors will be provided. Associated with each of the microprocessors is a read-only memory, [ROM] such as the ROMS 33-1 and 33-108. In these ROMS the programs for the individual microprocessors are stored. Similarly, associated with each microprocessor 31 is an I/O port, such as the I/O ports 35-1 and 35-108. The type of I/O port selected is one with a scratch pad memory. There is also associated with each microprocessor a random access memory [RAM] such as the memories 37-1 and 37-108. A total of 864 logic processors are required, one for each pixel in a line. Thus, associated with each microprocessor are eight logic processors of which there are shown logic processors 39-1a, 39-1b, and 39-1c for the microprocessor 31-1 and 39a, 39-108b, and 39-108c for the microprocessor 31-108. As indicated by the dots, between processors 39-1b and 39-1c, there will be an additional five processors. The arrows 41 indicate interconnection between the various logic processors which are necessary for reasons to be more fully explained below.

FIG. 4 also illustrates the general arrangement for each microprocessor. As illustrated, the microprocessor 31-1 is coupled to its ROM 33-1 and to its I/O port 35-1, which includes a scratch pad memory, over a data bus 43. The I/O port is coupled into the logic processors 39-1a, b and c by data bus lines 44-1a, b and c and the logic processor itself coupled over other data bus lines 45-1a, b, c, to the random access memory 37-1. The logic processor in addition to including Golay logic elements also includes bidirectional latches for accumulating data before transferring in or out in a manner explained below. The microprocessor 31 addresses the ROM 33, RAM 37 and I/O port 35 over a common address bus 51. The splitting of the data bus into two data buses 43-1 and 45-1 deviates from conventional practice in which the RAM 37 and ROM 33 would normally have a common data bus. In a manner to be more fully explained below, it permits transferring data between I/O ports 35, logic processors 39, and RAMs 37 without going through a microprocessor 31. This greatly speeds up the parallel processing.

In addition to the individual microprocessors, there is a host microprocessor 53 having its own ROM 55 and I/O port 57. In conventional fashion, the ROMs both for the host computer and for the individual microprocessors are used to store programs. The host I/O port 57 is coupled to the keyboard or terminal 23. Shown again on this figure is the CCD array 15, the output of which is coupled through an analog to digital converter 59 onto a master I/O bus 61 which is also connected to the host I/O port and to each of the individual I/O ports such as 35-1 and 35-108. The host I/O port also communicates with each of the microprocessors 31-1 . . . 31-108 over a reset interrupt line 63. In addition, host micro computer 53 through its I/O port 57 provides control signals to the A to D converter 59, and the CCD array 15, and function control signals for carrying out the various Golay transforms to each of the logic processors on a line 65. The microprocessors 31-1 . . . 31-108 also receive start/stop commands on lines 67-1 . . . 67-108 from OR gates 69-1 . . . 69-108. The OR gates receive as one input an output from the microprocessor 53 through the I/O port 57 and as second inputs, the outputs of a decoder 71. This permits the proper sequential input and operation of the various microprocessors.

In a manner to be more fully described below, the microprocessors 31-1 through 31-108 are sequentially started or made ready by decoded outputs from the decoder 71 receiving a control input from the most computer. Programs stored in their associated ROMs 33-1 through 33-108 are accessed in response to a command over the master I/O bus 61 before each transfer of data. When the first 8 bits of data have been converted they are transferred over the master I/O bus 61. At this point the microprocessor 31-1 has been enabled and is executing a program which addresses its I/O port 35-1 to instruct the I/O port to take the data at its input and store it in its scratch pad memory. Once this transfer is complete the next ROM is made ready and the next 8 bits of data placed in the scratch pad memory of its I/O port, and so on, until the last 8 bits of data are stored in the scratch pad memory of I/O port 35-108.

At this time, a command is sent to the CCD array on line 87 to begin an integrate cycle to gather more data. At the same time, a signal on line 64 is supplied to all of the OR gates 69-1 . . . 69-108 to place all microprocessors into operation. At the same time, the host microprocessor, over the master I/O bus instructs all of the microprocessors to go to the program in their associated ROM, e.g., 33-1, which is used to convert the 8 bit digital value representing transmittance into a single bit as necessary for the Golay transform. In this process, the 8 bit word is compared with a threshold. If it exceeds the threshold a "1" is generated and otherwise an "0" is generated.

At this point, it might be helpful to review what has happened. The CCD array scanned and generated, for each of the 864 samples, an analog signal. These analog signals were converted into 8 bit digital words. The first 8 words were stored in the scratch pad memory of the first I/O port 35-1. The next 8 words in the next I/O port and so on. After all the data was read out, the CCD array began another integrate cycle and during that time all microprocessors were operated to convert their eight 8 bit words into eight individual bits representing eight of the pixels on FIG. 2. Thus, the final output from he microprocessor 31-1, for example, is 8 bits, representing 8 pixels. This data is supplied to the I/O port 35-1 which then, in response to instructions from the microprocessor 31-1, transfers it into the logic processors. After the next line of data is read and 8 more pixels generated, these 8 pixels are transferred to the logic processor also, with the previous 8 pixels shifted.

Figure 5:
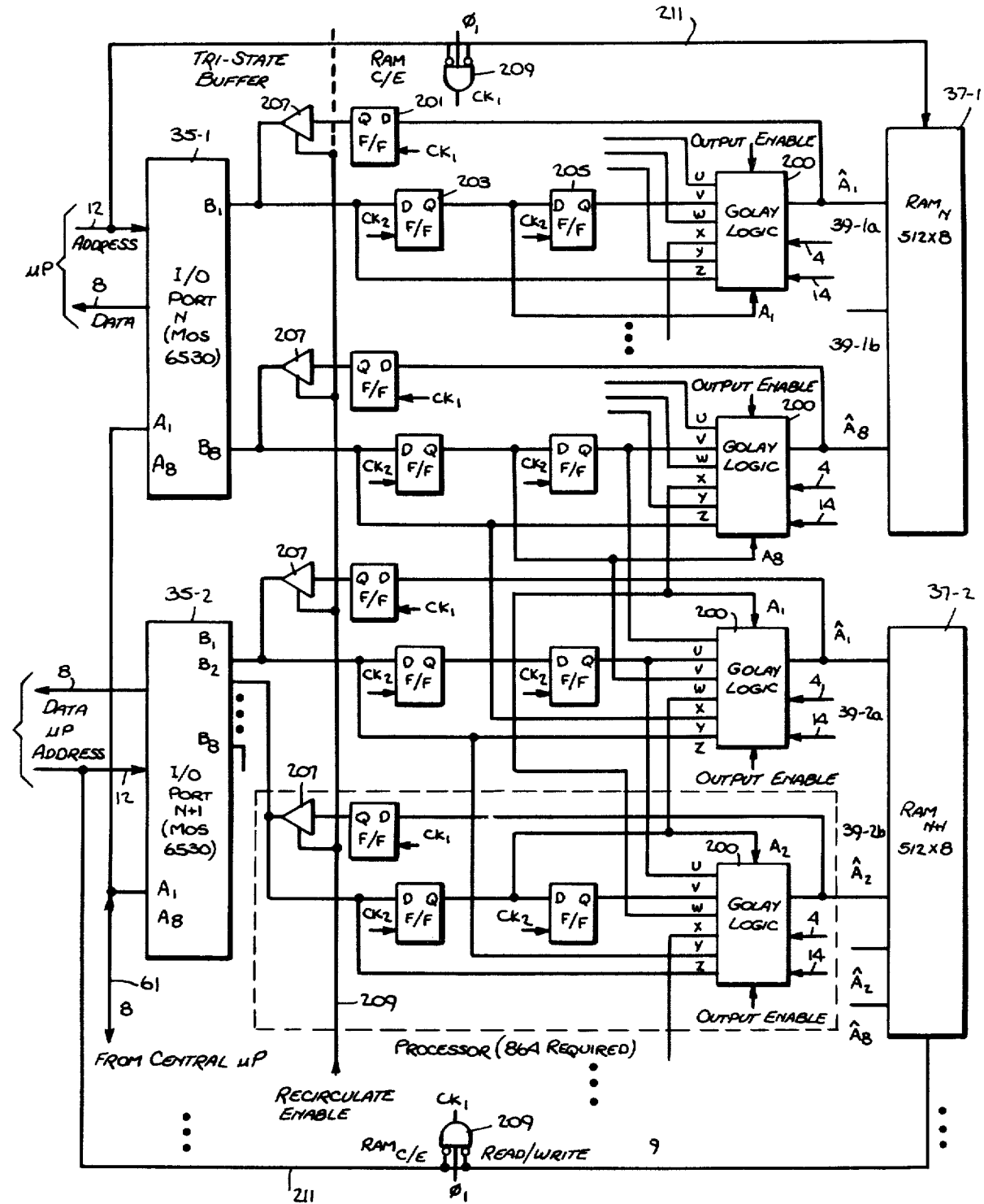
FIG. 5 is a more detailed block diagram of a portion of the parallel processor illustrated on FIG. 4.

FIG. 5 is a more detailed block diagram of a portion of the parallel processor illustrated on FIG. 4. Shown on this figure are I/O ports 35-1 and 35-2, their associated RAMs 37-1 and 37-2 and their associated logic processors 39-1a 39-1b, 39-2a and 39-2b. Each of the logic processors includes a Golay logic block 200 and three D type flip-flops 201, 203 and 205. Input data from the I/O port 35-1, i.e., the thresholded pixel information is coupled through the flip-flops 203 and 205, in a manner to be explained more fully below, to the Golay logic 39-1a.

During the phase of operation when data is being read in, this continues to happen until all data is read at which time, the total picture will be stored in the various RAMs 37-1, 37-2 etc.

Output data is coupled through the flip-flop 201 and an associated buffer 207 to the I/O port 35-1 and to the input of flip-flop 203. The buffers 207 are enabled by a line 209 entitled "recirculate enable". All of the flip-flops are D-type flip-flops which means that when a clock pulse is received, the data at their input will be transferred to their output. The flip-flops 203 and 205 are clocked by a clock designated $CK_2$. The flip-flop 201 is clocked by a clock $CK_1$. As shown, the clock $CK_1$ is generated in AND gates 209. This clock signal is generated when, on the line 211 which is taken off the 12-bit address bus, the RAM C/E phase 1 [$\phi_1$] and a read/write signal are present in the proper state [as indicated on the drawing the RAM C/E and read/write signals are inverted and thus the clock signal $CK_1$ will be generated only when these signals are not present].

The Address bus 211 also carries address signals to the RAMs 37-1 and 37-2, for example. Data from the microprocessor or from the CCD array on bus 61 is coupled to the inputs $A_1$-$A_8$ of the I/O ports. The outputs $B_1$-$B_8$ are coupled to the corresponding logic processors 39-1a, 39-1b, etc. Data received on the line 61 can be coupled through to the micro processor data bus 213, processed, and then brought back through the I/O port and the outputs $B_1$-$B_8$ to the logic processor. When processing is completed, data from the RAMs can be coupled through $B_1$-$B_8$ and out on to the data bus 213 or to the data bus 61.

In order to carry out the Golay logic processing data from three sample lines as well as from neighboring elements are required. This is the reason for providing the flip-flops 201, 203 and 205. These will contain the data from the three lines. As is clear from the discussion above, 8 blocks 200 are required for each microprocessor, one for each binary sample in a line of data. Each logic unit 200 has six inputs labeled u-z, for the six surround inputs and a center element labeled $A_n$. The surround data which must be provided as illustrated on FIG. 6 which repeats information previously shown on FIG. 2. Shown is the pixel $A_n$ and the surrounding pixels u-z which are required. From this drawing it is evident that the $u_1$, $w_1$ and $y_1$ inputs are obtained from processor N−1, i.e., the preceding processor, the inputs $v_1$, $A_n$ and $z_1$, from the processor N, and the input $x_1$ from the processor N+1. However, as shown by FIG. 7, for the next element, the A, $u_2$ and $y_2$ input are obtained from processor N, the $w_2$ input from processor N−1, and the $v_2$, $x_2$ and $z_2$ inputs from the processor N+1. Because of this, it is necessary for the Golay logic 200 to keep track of odd-even lines since only the x and w inputs remain unchanged between the odd and even lines of data.

Figure 8:
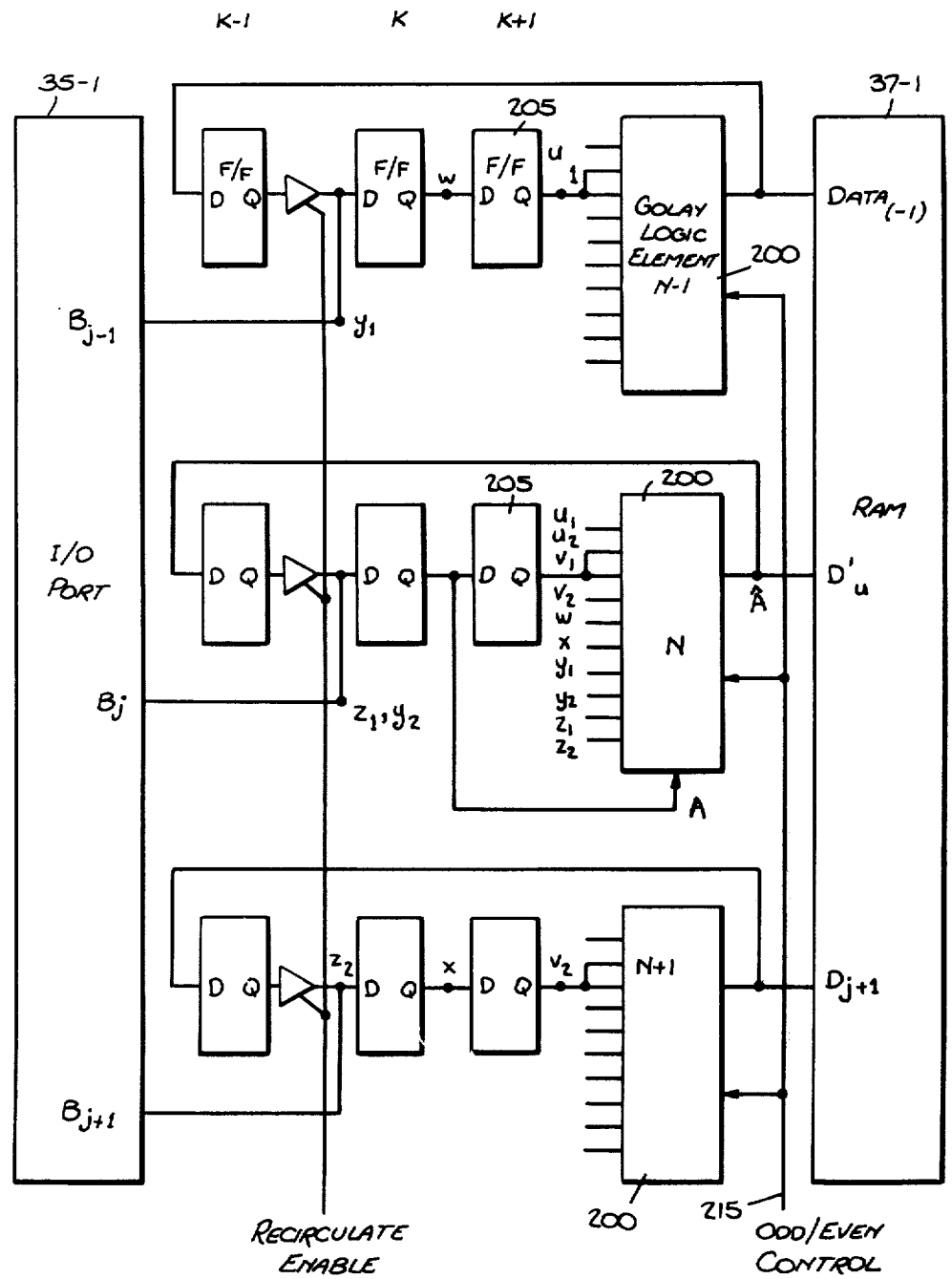
FIG. 8 is a block diagram illustrating the interconnection of adjacent logic elements.

On FIG. 8, three of the Golay logic elements 200 associated with the I/O port 35-1 and RAM 37-1 are shown with the required connections labeled for the Golay logic element N on FIGS. 6 and 7. Also, the corresponding points to which these lines must be connected are shown. Thus, for example $v_1$ and $u_2$ are connected to the output of the flip-flop 205 associated with the Nth Golay logic 200. These, inputs are obtained from flip-flop 205 associated with the Golay logic element 200 for the row N−1. In similar fashion, all of the other connections can be identified. Furthermore, as shown there is an odd-even control line input 215 to each of the Golay logic blocks 200 to select between $u_1$ and $u_2$, etc.

Figures 9, 9A:
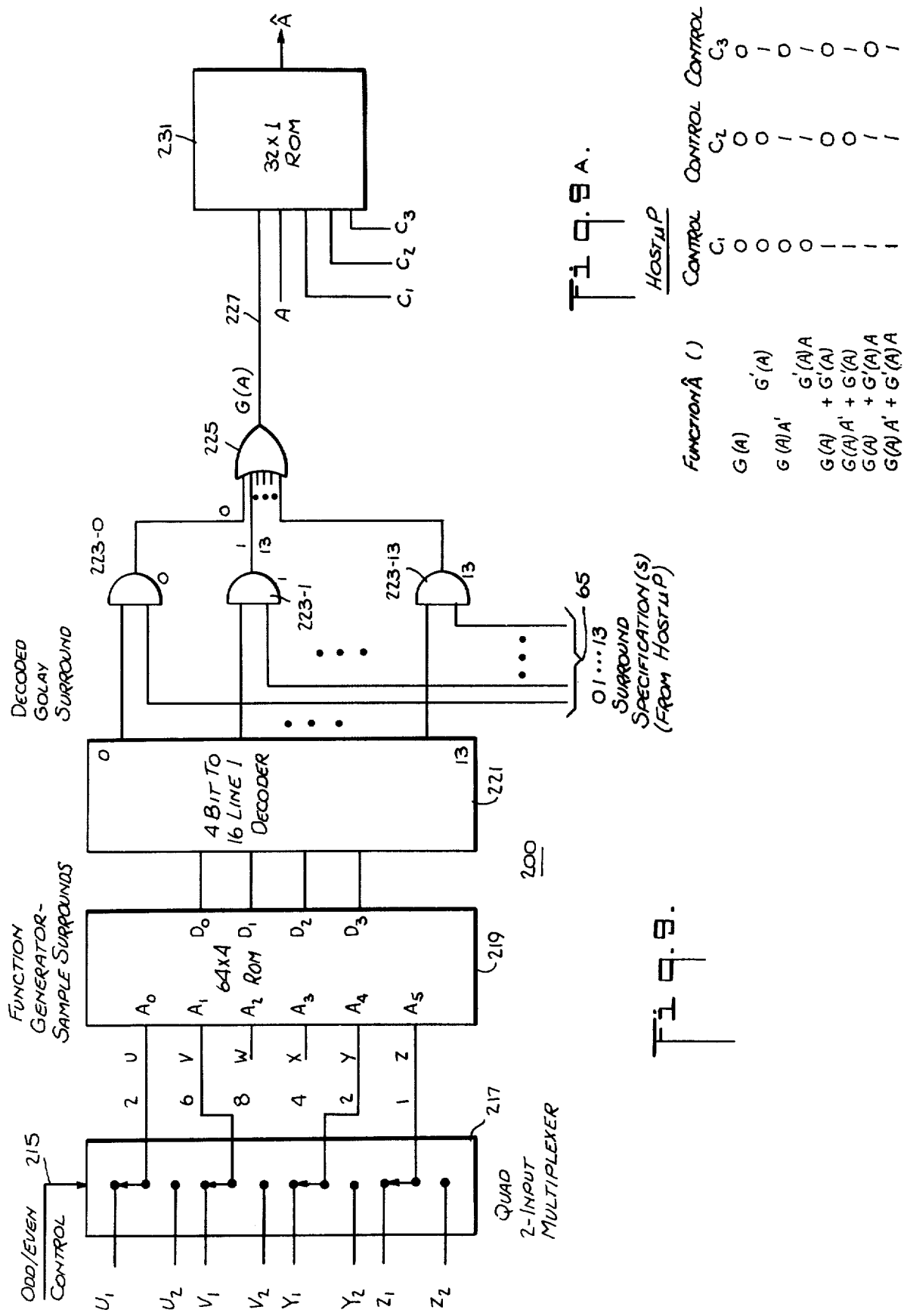
FIG. 9 is a more detailed block-logic diagram of one of the logic elements.
FIG. 9A sets out the various operations that are performed by the logic element in FIG. 9.

One of the Golay blocks 200 is illustrated on FIG. 9. Associated therewith is a FIG. 9A which will be explained below. The inputs, i.e., $u_1$, $v_1$, $y_1$ and $z_1$ etc., which must be switched are coupled into a quad 2 input multiplexer 217 which has as its control input the odd-even line 215. This makes the selection between the $u_1$ and $u_2$ etc. The outputs of the multiplexer 217 along with the inputs w and x, which do not change, are addresses inputs to a ROM 219 which is programmed to act as a function generator. The ROM 219 has a four bit binary output. As noted above in connection with FIG. 3, there are 14 possible surrounds. The output of the ROM 219 will be a number between 0 and 13 in binary form. The output of the ROM 219 is the input to a 4 bit to a 16 line decoder 221 of which only the first 14 outputs are utilized. The output of this block represents the decoded Golay surround. Furthermore, it must be recognized that a pattern, for example, the pattern having the Golay index 3 on FIG. 3 can appear as shown or can appear rotated. For example, refer to FIG. 10. A pattern of index 3 would result if $u_1$, $v_1$ and $w_1$ were all true. It would also result if $x_1$, $v_1$ and $u_1$ were true, if $v_1$, $x_1$ and $z_1$ were true, if $x_1$, $z_1$ and $y_1$ were true, and if $x_1$, $y_1$ and $w_1$ were true. Thus, ROM 219 is programmed such that for the ROM addresses associated with all above combinations the output will be a binary 3 which will be decoded and appear on line 3 of the decoder.

Each of the decoder 221 outputs is an input to an AND gate. Only the 0, 1 and 13 outputs of decoder 221 are shown coupled as inputs respectively to the AND gates 223-0, 223-1, and 223-13. The AND gates are all ORed in an OR gate 225, the output of which is the function G[A] on line 227. The second inputs to the AND gates are the surround specifications from the host microprocessor on lines 65. The host microprocessor can specify any one or more of the surrounds. If that surround is present the corresponding AND gate will have an output which is true or logical 1, and thus, as coupled through OR gate 225 the function G(A) will also be true or logical "1". The final element of the Golay logic 200 is a ROM 231. ROM 231 has as inputs G(A), and control specifications inputs $C_1$, $C_2$, $C_3$. A, of course, is the central pixel, i.e., the pixel in the center of the surround under consideration. The control specification determines the operation to be performed on A to determine the final output A.

FIG. 9A sets out the various operations that are performed. The ROM 231 is preprogrammed to carry out this operation. In other words, it acts as a function generator. Thus, if the control specification $C_1$, $C_2$, and $C_3$ are all zero and G (A) is also a zero, or not true, then A will also be zero. In the table, G'(A) is the complement of G(A) and A' is the complement of A.

The input circuitry is shown in more detail on FIG. 10. The CCD array 15 responds to the transmittance of the photographic transparency 13 of FIG. 1. It contains 1,728 sample elements which provide sample values as outputs. These sample values are in the form of a series of analog voltages representing the film transmittance.

A timing generator 101, under control of the host microprocessor 53, provides an integrate and a transfer command to the array. The integrate command causes it to scan and integrate a line of data and the transfer command causes it to begin shifting out the 1,728 samples in a sequential fashion. The data stream from the CCD array 15 is in a sampled analog format identical in form to the output of a pulse amplitude modulation modulator. It must be converted into digital form to be accepted by the processors. The sampled analog signal is first provided to a multiplexer/demultiplexer 103, i.e., the odd/even samples are selected for alternates lines. The multiplexer/demultiplexer is controlled by another output of the host micro processor to alternately select odd and even lines as described above in connection with FIG. 2. The multiplexer/demultiplexer supplies the sampled analog signal to an analog to digital converter 59, which converts the sampled analog data into an 8 bit digital word proportional to the analog signal. The converter is controlled by a convert signal on line 60 from the timing generator 101, such as to convert only when required. These signals are coupled through appropriate buffers 107 controlled again by an enable signal from the host computer, so as to gate them unto the master I/O bus 61.

FIG. 10 also shows in more detail the various control lines from the host microprocessor along with some details of the microprocessor itself. In conjunction with this drawing, a number of flow diagrams, and the previously described drawings, the operation of the system will now be explained. The operator of the system communicates with the host microprocessor 53 by means of a teletype 23 and a Universal Asynchronous Receiver Transmitter, serial interface 303 (UART). Preferably, this part of the system is set up to operate in a higher order language. For purposes of the present invention the details thereof are not essential, and thus will not be discussed. The microprocessor 53 has associated with it ROM 55 and RAM 75. Programs for the host microprocessor are stored in the ROM 55. In addition three I/O ports 57a–57c are provided.

The I/O port 57a has as its purpose controlling data input and transfer operations. The I/O port 57b has as its purpose supplying the Golay surround information, generating a non-maskable interrupt and generating a reset to the microprocessors. I/O port 57-3 provides outputs for the control specification in the Golay logic, provides the data which is decoded by the decoder 71, and also generates the single processor enable and parallel mode enable signals.

Figure 11:
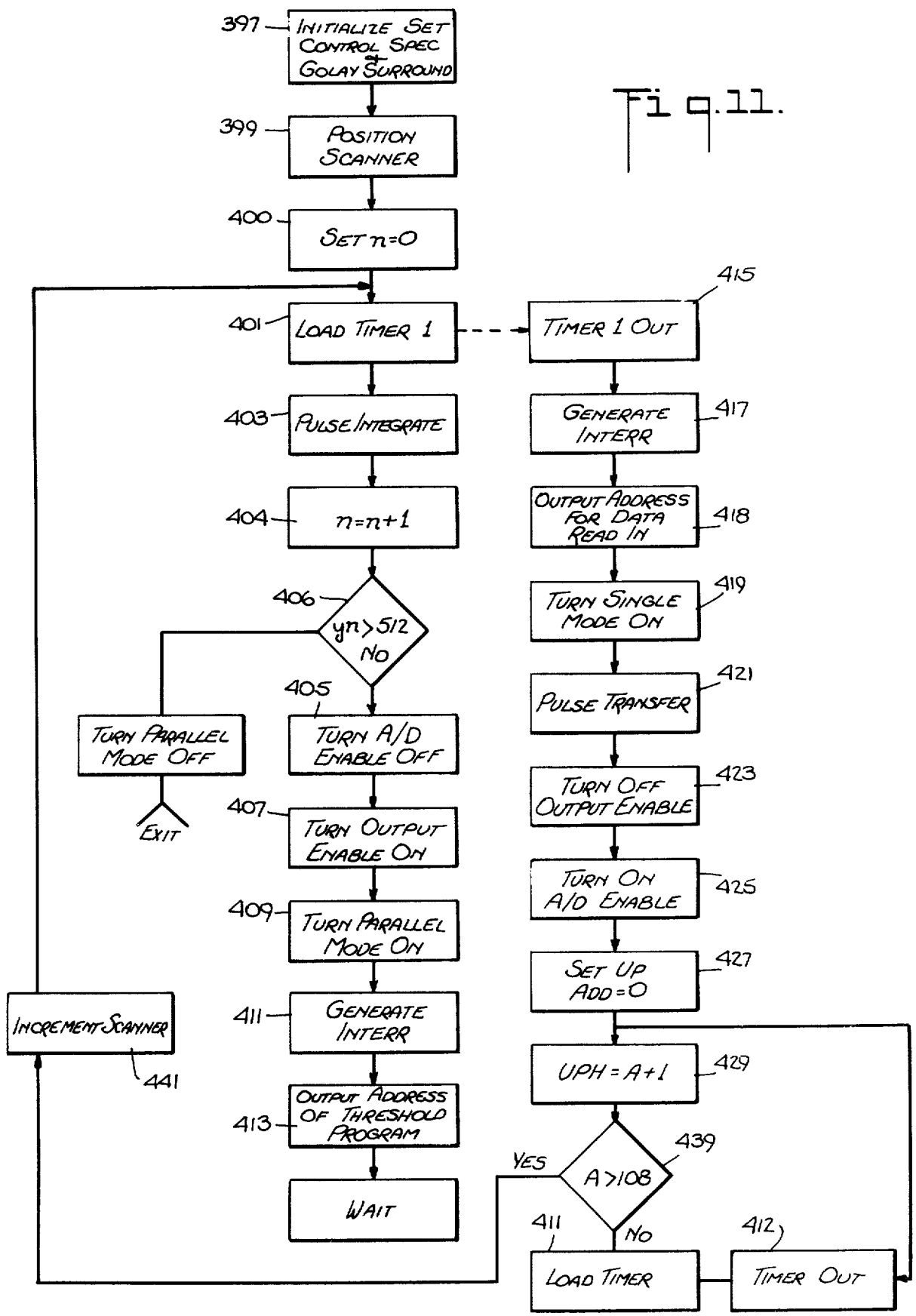
FIG. 11 is a flow diagram of the operation of the system.

In the first phase of operation the operator selects the Golay transformation to be performed. It is presumed that at this point data is to be read. Thus, it is desired that the data reach the RAM 37-1, for example, of FIG. 5 without any transform. In other words, the function A should be equal to G(A). Any or all of the surrounds 0–13 are selected. What this means is that the lines C1–C3 from the I.O. port 57c will be "0", and that the output lines S0—S13 will have the desired pattern thereon. This step is indicated by block 397 of the flow diagram of FIG. 11. Once this is done, the second mode is entered. This is the mode in which data is read in. As indicated by block 399 the next step is to position the scanner, i.e., the CCD array 15. This is done by providing appropriate output signals from the I/O port 57a on the lines labeled "CCD XY position control". Although not shown on FIG. 1 in detail the scanner 15 will be supported for X and Y motion. Thus, after scanning a line in one position, it can be moved in X and Y to scan another line or another portion of the first line. Next, as indicated by step 401 the host microprocessor 53 sets a value N=0 where N equals the line number. In the next step, 401, a timer is loaded. This timer is loaded with the time required for the scanner to scan and integrate. It is also the time required for the individual microprocessors to process data from the previous line. After the timer is loaded, an output is provided on line 301 pulsing the CCD array and instructing it to integrate a line. This is indicated by block 403. Next, N is incremented by 1 as indicated in block 404. After checking to see if the line number is greater than 512 in block 406, in the next step, the analog to digital enable signal on line 317 is turned off as indicated by block 405 and the output enable is turned on as indicated by block 407. Next, parallel mode on line 307 is turned on as indicated by block 409 whereafter an interrupt is generated on line 63a as indicated by block 411. The interrupt, as shown by FIG. 11 causes the individual microprocessors to go to a program which tells them to load the next two words which appear on the data bus and to then go to the address indicated. These two words are provided by the host microprocessor as indicated by block 413. They address a stored threshold program in which previous data stored in the scratch pad memory is compared with a threshold value in order to generate the pixels in binary form. When the time on the timer 1 runs out as indicated by block 415, another interrupt is generated as indicated by block 417 and a new address provided as indicated by block 418 to tell the individual microprocessors that they will now be required to execute a stored read in program. Thereafter, single mode is turned on and parallel mode off as indicated by block 419, and a transfer signal provided on line 303 as indicated by block 421. The output enable is turned off as indicated by block 423 and the A/D enable turned on as indicated by block 425. The address provided on lines D1 . . . D7 of I/O port 57c is set to 0 as indicated by block 427 and is then incremented by 1 as indicated by block 429. Thus, it will now be addressing the first microprocessor. Only that processor will be enabled. A comparison is made in the comparison block 439 to see if the address is greater than 108. If not, as indicated by block 441, a timer is loaded. The host microprocessor now waits for a long enough time for 8 words to be read into the first microprocessor. At the end of the required time, the timer will time out and the program loops back to block 429 where the address is incremented by 1. The comparison made again in block 439 and the timer started again. Now the second microprocessor receives its 8 words of data. Finally, when the counter is incremented to 109 it is known that all data has been stored and the program follows the YES side of block 439 whereupon it increments the scanner as indicated in block 441. It then loops back to block 401 where the integrate cycle is carried out and during which time all microprocessors are accessed and take the data just stored and using their threshold program, convert it into "0"s and "1"s for use in further processing. The program for loading data into the scratch pad memory is shown on FIG. 13 and is quite straight forward. It is simply a series of instructions to store the information present at the input to the I/O port, i.e., the information on the master I/O bus into sequential locations in the scratch pad memory.

Figure 13:
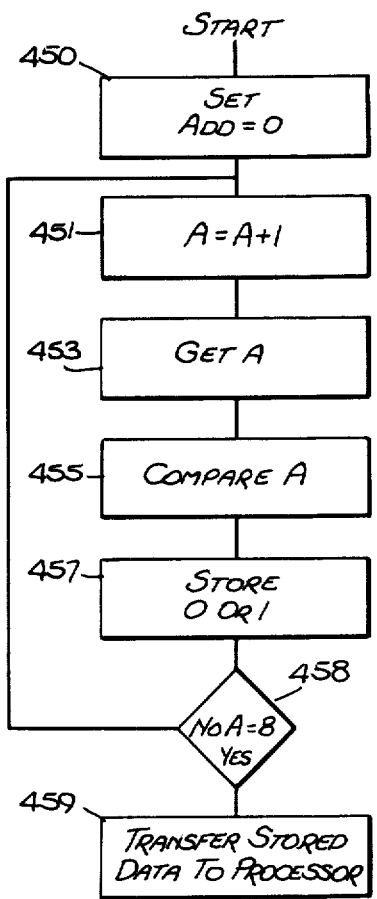
FIG. 13 is a flow diagram of the program for doing thresholding.

The program for doing the thresholding is illustrated by FIG. 13. It too is straight forward. After receiving the interrupt and going to the proper address location the program as indicated by block 450 sets the scratch pad address to "0". In the next step in block 451 it increments this address. And, as indicated by block 453 it obtains the data stored at that address and then, as indicated in block 455, compares it with the stored threshold value. Depending on the results of the comparison, it stores either a "1" or a "0" in the first bit location of an appropriate register. A comparison is then made to see whether an address has been incremented to the eighth location. If the answer is NO, the program loops back to block 451 and repeats the process. After it is gone through eight times, then all of the thresholding has been done and a block 459 is entered which causes the data, i.e., the 8 bits which have been thresholded, to be transferred to the logic processor. Naturally, all of the operations are under the control of the common clock, i.e., the $\phi_1$ and $\phi_2$ clocks associated with the microprocessor and other signals generated by the timing generator 101 of FIG. 10. Generator 101 also drives the multiplexer/demultiplexer arrangement made up of blocks 305 and 307 to take care of the odd and even switching which is necessary. Capacitors are provided in these devices to provide a smoothing function from sample to sample. Referring now to FIGS. 5 and 8, it can be seen that during the last step of the program of FIG. 14, i.e., block 459, in the transfer step that an appropriate address must be provided on the bus 211 of FIG. 9 in order that the data which is being fed in reaches the RAM 37-1, for example, furthermore, it will also be apparent that as the data is shifted through it will be processed.

Once all data is read in, processing of that data with any of the various processes illustrated by FIG. 9A may take place. Processing takes place on all data in parallel. To carry out such processing, referring to FIG. 10, the parallel mode enable line 307 is enabled, the control specification corresponding to the function shown on FIG. 9A which is desired, is provided out of the I/O port 57c and the Golay surround specification set in on the lines S0—S13. The recirculate enable line 209 is also enabled. Each of the microprocessors 31-1 . . . 31-108 is instructed to access a stored program in which they simple increment RAM addresses. Thus, referring to FIG. 5, each microprocessor will step through each of the 512 addresses of the RAM. In sychronism therewith, the data will be stepped through the flip-flops 201, 304 and 205 and circulated back to the RAM after processing. After having been processed, the elements now stored in the RAMs will represent a processed picture. If desired, further processing can be carried out. Detailed examples of the type processing are given in the aforementioned patent. The same processing that is disclosed therein is carried out in the apparatus of the present invention. The difference is, however, that processing is carried out on the whole line of data at the same time rather than on a single picture element or pixel. Thus, in the present example, the overall picture will have 512 lines of 864 pixels. However, the 864 pixels per line will be processed simultaneously so that after 512 steps processing of the whole picture will have taken place.

What is claimed is:

1. Image analysis apparatus comprising:
   a. means to store a plurality of M lines of data, each line made up of spaced pixels with the elements in adjacent odd and even rows offset by one half the distance between pixels so as to generate a hexagonal array, said storing means storing data from adjacent lines in adjacent locations whereby the data in adjacent locations will represent pixels which are offset from each other, the data represented in each even location being offset by the same amount from the data in each odd location;

b. a plurality of Golay logic processors each capable of receiving as inputs the data representing a central image element and data representing the six image elements forming a hexagonal surround thereabout;

c. means to make available as outputs the data for three adjacent lines stored in said means to store;

d. means to couple to each of said Golay logic processors data representing a central element and the six surrounding elements;

e. means to sequentially shift the data in said storage means into said means providing outputs so that the central element from each line of data is sequentially provided to said Golay logic processors; and f. means responsive to said shifting means to selectively couple outputs associated with different adjacent data locations to said Golay logic means in response to said shifting and to indicate whether the central element is from an odd or an even line.

2. Apparatus according to claim 1 wherein said Golay logic processor comprises:

a. a first function generator having as inputs the data representing the six surrounding pixels and providing an output indicative of which of the fourteen possible surround designation said inputs defined irrespective of rotation;

b. means to compare the desire surround with the actual surround and provide an output indicative thereof; and c. second function generating means having as inputs the data to define said central pixel, the output of said comparing means and a Golay specification defining an operating to be performed, the output of said means being a single bit describing the state of the central element after having had said operation performed thereon.

3. Apparatus according to claim 2 wherein said first function generating means comprises a read only memory having as address inputs said surround data and providing as an output the surround number corresponding to said input data in binary form, and a binary to decimal decoder to decode said binary information.

4. Apparatus according to claim 3 wherein said comparing means comprise a plurality of AND gates and further including an OR gate having as inputs the outputs of all of said AND gates.

5. Apparatus according to claim 4 wherein said second function generator comprises a read only memory having as address inputs the output of said OR gate, the data describing said central element and said control specification.

6. Apparatus according to claim 1 wherein said storage means comprise a random access memory, said means for providing data comprises three flip flops coupled in series, the first of said flop flops having its input coupled to the output of said memory, each of said flip flops having an output coupled into said Golay logic processors, the output of each of said Golay logic processors being data inputs to said read only memories, and wherein said means for sequentially addressing locations in said random access memory and for synchronously therewith shifting data through said flip flops comprises a microprocessor.

7. Apparatus according to claim 6 and further including means for reading data into said random access memory.

8. Apparatus according to claim 7 wherein said means for reading data into said memory comprises:

a. a common data bus;

b. an input/output port associated with said microprocessor and controlled thereby receiving an input from said data bus; and c. means to enable said microprocessor to accept data from said input/output port and to transfer said data to said random access memory.

9. Apparatus according to claim 8 and further including means for scanning an image.

10. Apparatus according to claim 9 wherein said scanning means comprise a charge coupled device scanner providing discrete analog outputs representing a plurality of pixels which are scanned and further including:

a. means to select either odd or even pixels on adjacent lines;

b. analog to digital conversion means to convert the selected analog pixel information into a digital word; and c. thresholding means for thresholding said digital word with a predetermined level to generate a binary pixel element which is a 1 or a 0.

11. Apparatus according to claim 10 wherein said means for thresholding comprise said microprocessor.

12. Apparatus according to claim 11 wherein said input/output port includes scratch pad memory capable of storing a plurality of digital words representing said pixels.

13. Apparatus according to claim 12 wherein a large plurality of microprocessors in parallel, each having associated therewith an input/output port, a random access memory, flip flops and said Golay logic processors, are provided.

* * * * *

UNITED STATES PATENT AND TRADEMARK OFFICE
CERTIFICATE OF CORRECTION

PATENT NO. : 4,224,600

DATED : September 23, 1980

INVENTOR(S) : Harvey R. Sellner

It is certified that error appears in the above-identified patent and that said Letters Patent are hereby corrected as shown below:

Column 2, line 17, change "microprocessors" to --microprocessor--.

Column 4, line 32, change 39a, to --39-108a,--

Column 5, line 20, change "most" to --host--

Column 10, line 44, change "simple to --simply--

Column 12, line 7, change "flop" to --flip--

Signed and Sealed this

Seventh Day of April 1981

[SEAL]

Attest:

RENE D. TEGTMEYER

Attesting Officer

Acting Commissioner of Patents and Trademarks